United States Patent
Simson et al.

[11] Patent Number: 5,947,656
[45] Date of Patent: Sep. 7, 1999

[54] MORTISE DRILLING TEMPLATE

[76] Inventors: Anton K. Simson, 13227 Aubrey St., Poway, Calif. 92064; Mark T. Bentley, 2133 Shadetree La., Escondido, Calif. 92019; Robert C. Bentley, 211 Tanglewood, Duncanville, Tex. 75116

[21] Appl. No.: 09/012,740

[22] Filed: Jan. 23, 1998

[51] Int. Cl.⁶ .................................................... B23B 49/02
[52] U.S. Cl. ...................... 408/97; 408/115 R; 408/241 B
[58] Field of Search .................... 408/72 B, 97, 408/103, 115 R, 115 B, 88, 241 B, 241 G, 3

[56] References Cited

U.S. PATENT DOCUMENTS

| | | | |
|---|---|---|---|
| 3,465,620 | 9/1969 | Hilburn | 408/115 R |
| 3,626,513 | 12/1971 | Pytlak | 408/97 |
| 4,194,861 | 3/1980 | Keller | 408/115 R |
| 5,697,654 | 12/1997 | MacDonald | 292/66 |
| 5,791,834 | 8/1998 | Zehrung | 408/97 |

FOREIGN PATENT DOCUMENTS

| | | | |
|---|---|---|---|
| 2142164 | 3/1973 | Germany | 408/103 |

*Primary Examiner*—Daniel W. Howell
*Attorney, Agent, or Firm*—Henri J. A. Charmasson; John D. Buchaca

[57] ABSTRACT

A drilling template for carving into the lateral edge or the jamb of a door, a cavity shaped and dimensioned to receive either a flanged lock or its strikeplate has a series of drill bit bores at regular spaced-apart intervals along a central line, a pair of lateral legs with sharp ends, and mounting holes corresponding to those of the lock or strikeplate. The template is designed to be hammered into the door edge or jamb until the sharp edge-ended edges define the outline of the lock flange or of the strikeplate as well as the amount of wood to be removed to form the mortise necessary to nest those elements. The template can be screwed in place through mounting holes that correspond to those of the lock or strikeplate. A drill is used to rout the cavity through the drill bit bores. Guides in either side of the bores prevent lateral movement of the bit, but allow slight longitudinal swing to remove material that may remain between holes. Lateral spacers are provided to align the template against the angled part of the door jamb.

20 Claims, 1 Drawing Sheet

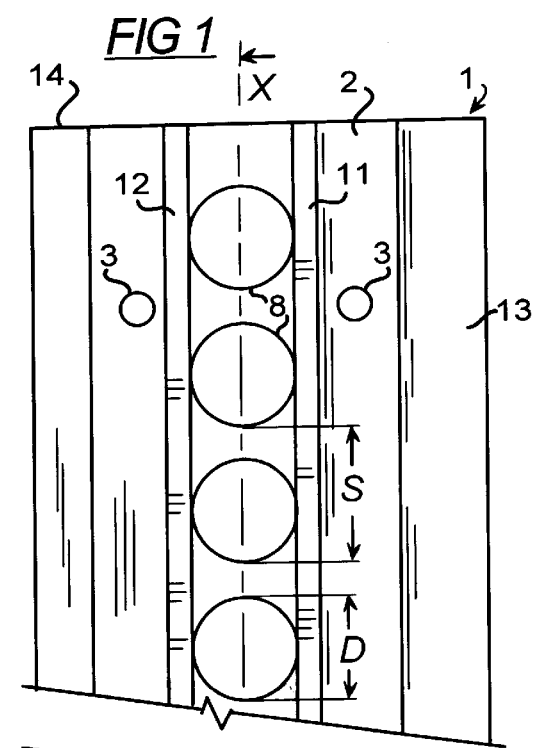
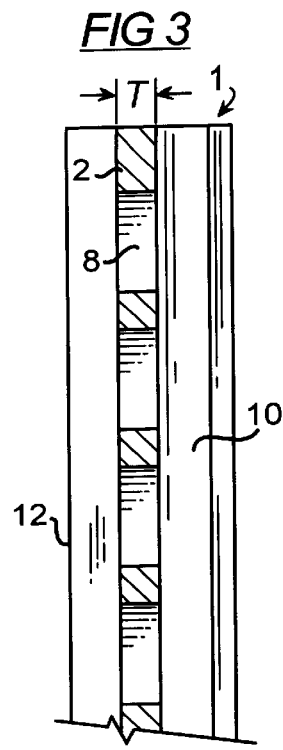
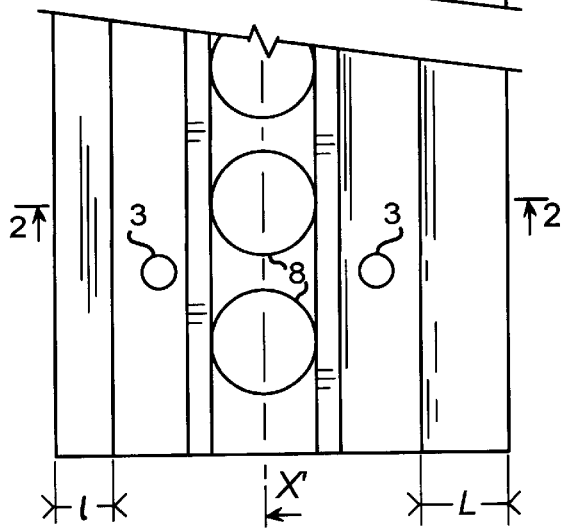
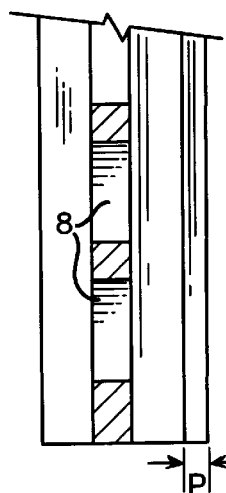
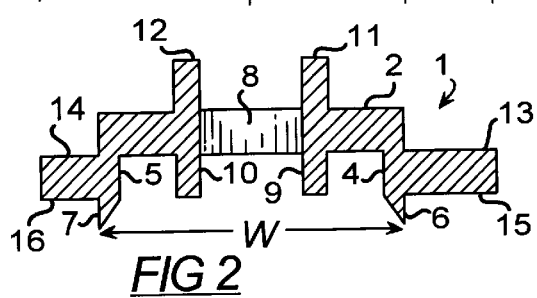
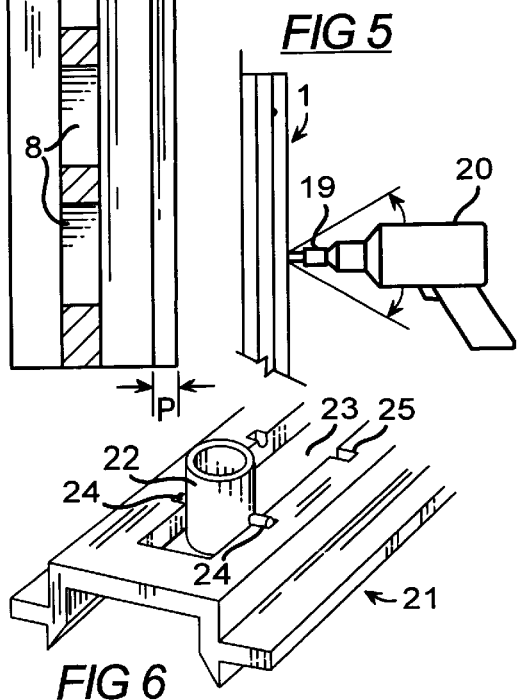

… (partial)

MORTISE DRILLING TEMPLATE

FIELD OF THE INVENTON

This invention relates to woodworking templates such as those used in connection with routers and hand drills.

BACKGROUND OF THE INVENTION

The installation of a door or window lock often requires the carving of a cavity in the edge of the door to accommodate, if not the entire lock, at least its bolt, and the corresponding strikeplate and mortise that receives the bolt. Some locks of European design have wide rectangular bolts instead of the circular bolts commonly found in American-made locks. These rectangular bolts require the cutting of narrow long cavities seldom exceeding 0.95 centimeter (⅜ of an inch) in width. Blade locks such as the one disclosed in U.S. Pat. No. 5,697,654 MacDonald required the cutting of a narrow, deep and long slot into the door edge to accommodate the lock blade, and a similar slot in the door jamb to accommodate the receiving strikeplate. While a router can be used to cut the slot in the door edge, the angled shape of door jambs make the use of a router difficult, if not impossible, to an unskilled or semi-skilled homeowner. Until now this type of blade lock has required professional installation.

SUMMARY OF THE INVENTION

The principal and secondary objects of this invention are to provide a convenient tool for carving a long and narrow cavity in the edge of a door or a door jamb that can readily receive a lock or its strikeplate without having to use a router and complex and expensive tool jigs, and to delineate with ease and precision, the lock mounting flange and strikeplate mortise as well as their mounting holes with such a simplicity that it can be done by a person with a modicum of mechanical skill.

These and other valuable objects are achieved through the use of a simple drilling template having sharp legs that can be easily hammered into the door edge or the door jamb to define, not only the outline of the lock mounting flange or the strikeplate, but also the position of the mounting holes and the amount of material that must be removed to form their receiving mortises. A series of regularly spaced-apart drill bit holes are provided along the central line of the template to guide the user in the routing of the cavity by means of a common hand drill. Guards along the edges of the drill bit holes prevent lateral movement of the drill bit but allow for slight transversal movement to remove the material remaining between holes. Spacers projecting from either side of the template help its positioning against the angled part of the jamb at the appropriate distance corresponding the thickness of the door.

BRIEF DESCRIPTION OF THE DRAWING

FIG. 1 is a top plan view of the template according to the invention;

FIG. 2 is a cross-sectional view taken along line 2—2 of FIG. 1;

FIG. 3 is a cross-sectional view taken along line X–X' of FIG. 1;

FIG. 4 is a diagrammatical illustration of the positioning of the template on the door jamb;

FIG. 5 is a diagrammatical illustration of the drilling process; and

FIG. 6 is a partial perspective view of an alternate embodiment of the template.

DESCRIPTION OF THE PREFERRED EMBODIMENT OF THE INVENTION

The preferred embodiment of the invention is specifically intended for use in installing blade locks of the type disclosed in U.S. Pat. No. 4,697,654 MacDonald which patent is incorporated in this specification by this reference.

Referring now to the drawing, there is shown a template 1 which has a central flat and elongated portion 2 whose outline corresponds to that of the mounting flange of the lock as well as its strikeplate. Mounting holes 3 along the sides and at each end of the template are preferably provided at the same locations as the mounting holes of the lock or strikeplate. Projecting orthogonally from the parallel edges of the central portion 2, are a pair of legs 4, 5 whose distal portions 6, 7 are tapered down to sharp ends. The spacing W between the sharp ends correspond to the width of the lock mounting flange or of the strikeplate. A series of drill bit bores 8 are provided at regular spaced-apart intervals S along the central line XX' of the central portion 2. The spacing S between bores is approximately equal to five fourths of the bore diameter D. In the preferred embodiment of the invention the bores have a diameter ranging from 0.8 to 0.95 centimeters (⁵⁄₁₆ to ⅜ of an inch). Parallel guide walls 9, 10 extend between the legs 4, 5 on either side of the series of bores 8. Similar guide walls 11, 12 extend on the opposite side of the central portion 2. Those guide walls are designed to prevent lateral movement of the drill bit. The relatively shorter thickness T of the central portion, by contrast, allows for a certain degree of longitudinal swing of the drill bit. The thickness T of the central portion should not exceed about one-half of the diameter D of the bores. The difference P between the length of the internal guiding walls 9, 10 and the length of the legs 4, 5 corresponds preferably to the thickness of the lock mounting flange or of the strikeplate so that when the template is hammered down into the edge of the door or into the door jamb until the internal guiding walls 9, 10 become in contact with the door or jamb material, the amount of penetration P of the leg into the material corresponds to the amount to be removed in order to form the mortise that will nest the lock mounting flange or the strikeplate.

A pair of spacers 13,14 project outwardly and orthogonally from the outer side of the legs 4, 5. Those spacers have different lengths L, l, and are intended to help positioning the template against the door jamb at a given distance from the angled part of the jamb. That given distance either L or l is predicated on the thickness of the door. It should be noted that the lower sides 15, 16 of the spacers are at the same levels as the end of the internal walls 9, 10 in order to provide a convenient indication to the user how far the template should be hammered down into the door edge or door jamb.

As illustrated in FIG. 4, the template 1 is hammered into the door jamb 17 with one of the spacers 13 abutting the angled part 18 of the jamb. Typically, a 4.5 centimeter (1.75 inch) door thickness would require the use of the longer spacer 14. A 3.2 centimeter (1.25 inch) door thickness would call for the use of the shorter spacer 13.

It can now be understood that this type of template can be conveniently positioned against the door edge or the door jamb then hammered down to delineante the mounting flange or strikeplate mortise before it is fastened with screws using the mounting holes 3 which are in the same location where the mounting screws of the lock or strikeplate are positioned. As illustrated in FIG. 5, the drilling of a mortise in either the door edge or the door jamb is a multi-step, yet uncomplicated operation requiring a modicum of skill. A sleeve 19 may conveniently be mounted on the drill bit to limit its penetration to the depth required by the lock or the bolt. Using a hand-drill 20, the user begins by drilling a series of perpendicular holes through the guide bores 8 to the desired depth corresponding to the width of the lock or the width of the strikeplate. In a second pass, the drill is tilted longitudinally at an angle of approximately thirty degrees, first in one direction then, in a third pass, to the same angle, in the opposite direction in order to remove the material remaining between the series of drill holes. Due to the fact that the bottoms of the guide bores 3 are spaced apart from the surface of the door edge or door jamb, the angled drilling is sufficient to remove all the material between the initial right angle holes. The template is then removed and the drill may be run up and down the slot or mortise like a router to smooth out the gap between the holes before mounting the lock or its strikeplate.

It should be understood that the outer set of guide walls 11, 12 could be omitted without seriously downgrading the effectiveness of the template.

In an alternate embodiment 21 of the invention illustrated in FIG. 6, the guide walls are replaced by one or a set of guiding sleeves 22 swingingly mounted into a slot 23 running along the central line of the template. Small pivot nibs 24 extending from opposite sides of the sleeves are either permanently attached to the edges of the slot or ride in small bearing notches 25 cut into those edges.

The template may be made of steel, aluminum or a hardened plastic such as a glass-reinforced plastic.

While the preferred embodiment of the invention has been described, modifications can be made and other embodiments may be devised without departing from the spirit of the invention and the scope of the appended claims.

What is claimed is:

1. A drilling template for carving a flange cavity into a door edge or door jamb which comprises:

an elongated body comprising a substantially flat central portion having parallel lateral edges and a central line;

two legs projecting orthogonally in the same direction respectively from said lateral edges;

wherein said central portion has at least one transverse bore along and perpendicular to said central line; and wherein said central portion stands apart from said door edge or door jamb when said template is applied thereto.

2. The template of claim 1, which further comprises a pair of parallel drill bit guides projecting from said central portion astride and contiguously to said bores.

3. A drilling template for carving a flange cavity into a door edge or door jamb which comprises:

an elongated body comprising a substantially flat central portion having parallel lateral edges and a central line;

two legs projecting orthogonally in the same direction respectively from said lateral edges;

wherein said central portion has at least one transverse bore along and perpendicular to said central line; and wherein a distal section of each of said legs tapers down to a sharp edge.

4. A drilling template for carving a flange cavity into a door edge or door jamb which comprises:

an elongated body comprising a substantially flat central portion having parallel lateral edges and a central line;

two legs projecting orthogonally in the same direction respectively from said lateral edges;

wherein said central portion has at least one transverse bore along and perpendicular to said central line;

wherein said at least one transverse bore comprises a plurality of circular bores having a common diameter and constant interspacing; and wherein the interspacing of said bores is approximately equal to five fourths of said diameter.

5. The template of claim 3 for use in drilling a mortise sized and dimensioned to receive a lock or its strikeplate, said lock having a mounting flange of given width, thickness and peripheral outline, and being pierced with fastener holes;

wherein said sharp edges are spaced apart by said width, and said central portion has additional holes sized and positioned to match said fastener holes.

6. A drilling template for carving a flange cavity into a door edge or door jamb which comprises:

an elongated body comprising a substantially flat central portion having parallel lateral edges and a central line;

two legs protecting orthogonally in the same direction respectively from said lateral edges;

wherein said central portion has at least one transverse bore along and perpendicular to said central line;

wherein said at least one transverse bore comprises a plurality of circular bores having a common diameter and constant interspacing; and wherein said template further comprises a first positioning spacer projecting outwardly and orthogonally from one of said legs.

7. The template of claim 6, which further comprises a second positioning spacer projecting outwardly and in opposite direction to said first positioning spacer from the other of said legs.

8. The template of claim 7, wherein said positioning spacers are of different lengths, and said lengths are selected to position the template on a door jamb in accordance with either of two door thicknesses.

9. A drilling template for carving a flange cavity into a door edge or door jamb which comprises:

an elongated body comprising a substantially flat central portion having parallel lateral edges and a central line;

two legs projecting orthogonally in the same direction respectively from said lateral edges;

wherein said central portion has at least one transverse bore along and perpendicular to said central line;

wherein said at least one transverse bore comprises a plurality of circular bores having a common diameter and constant interspacing; and wherein said template further comprises a pair of parallel drill bit guides projecting from said central portion astride and contiguously to said bores.

10. The template of claim 5, wherein said central portion has a peripheral outline commensurate with the peripheral outline of said mounting flange.

11. The template of claim 10, wherein said guides extend between said legs to a distance shorter than said legs to an amount substantially equal to the thickness of said flange.

12. The template of claim 9, wherein a distal section of each of said legs tapers down to a sharp edge.

13. The template of claim 1, wherein said at least one transverse bore comprises an elongated slot; and which further comprises at least one bit-guiding sleeve swingingly mounted within said slot.

14. The template of claim 1, wherein said at least one transverse bore comprises a plurality of circular bores having a common diameter and constant interspacing.

15. The template of claim 1, wherein a distal section of each of said legs tapers down to a sharp edge.

16. The template of claim 1, wherein the interspacing of said bores is approximately equal to five fourths of said diameter.

17. The template of claim 1, which further comprises a first positioning spacer projecting outwardly and orthogonally from one of said legs.

18. The template of claim 17, which further comprises a second positioning spacer projecting outwardly and in opposite direction to said first positioning spacer from the other of said legs; and wherein said positioning spacers are of different lengths, and said lengths are selected to position the template on a door jamb in accordance with either of two door thicknesses.

19. The template of claim 9, which further comprises a first positioning spacer projecting outwardly and orthogonally from one of said legs.

20. The template of claim 19, which further comprises a second positioning spacer projecting outwardly and in opposite direction to said first positioning spacer from the other of said legs; and wherein said positioning spacers are of different lengths, and said lengths are selected to position the template on a door jamb in accordance with either of two door thicknesses.

* * * * *